United States Patent [19]
Canright

[11] 3,942,425
[45] Mar. 9, 1976

[54] COMBINATION MEAT SMOKING DEVICE AND MERCHANDISE DISPLAY CASE

[76] Inventor: Bruce W. Canright, 204 Gardenview Drive, San Antonio, Tex. 78213

[22] Filed: Sept. 18, 1974

[21] Appl. No.: 506,991

[52] U.S. Cl. .................................. 99/467; 99/480
[51] Int. Cl.² ............................................ A23B 4/04
[58] Field of Search ..................... 99/467, 339–340, 99/346, 421, 446, 450, 477, 478, 479, 480

[56] References Cited
UNITED STATES PATENTS

| | | | |
|---|---|---|---|
| 1,413,671 | 4/1922 | Lorenzen | 99/479 |
| 2,012,702 | 8/1935 | Zolotas | 99/421 P X |
| 2,205,914 | 6/1940 | Stafford | 99/479 X |
| 2,338,156 | 1/1944 | Allen | 99/480 X |
| 2,517,360 | 8/1950 | Singer | 99/421 P X |
| 2,537,378 | 1/1951 | Staltare | 99/421 V X |
| 2,549,019 | 4/1951 | Saunders | 99/421 P |
| 2,558,569 | 6/1951 | Koch | 99/421 V X |
| 2,645,993 | 7/1953 | Voss | 99/480 |
| 2,930,310 | 3/1960 | Poppenburg | 99/479 X |

*Primary Examiner*—Robert L. Bleutge
*Assistant Examiner*—Arthur O. Henderson

[57] ABSTRACT

This device consists primarily of a base of refractory material in which is mounted an electric motor which by elongated shaft means, will serve to rotate a cylinder which by hook means will support various meats to be smoked on the interior of a transparent cylinder mounted to the base. The device includes an upper cover having manually rotatable, vent control means and the device further includes illuminating means for the interior of the cylinder and the circuit includes heating element means, rheostat means and switch means for controlling the heat, the motor, and the illuminating means.

9 Claims, 8 Drawing Figures

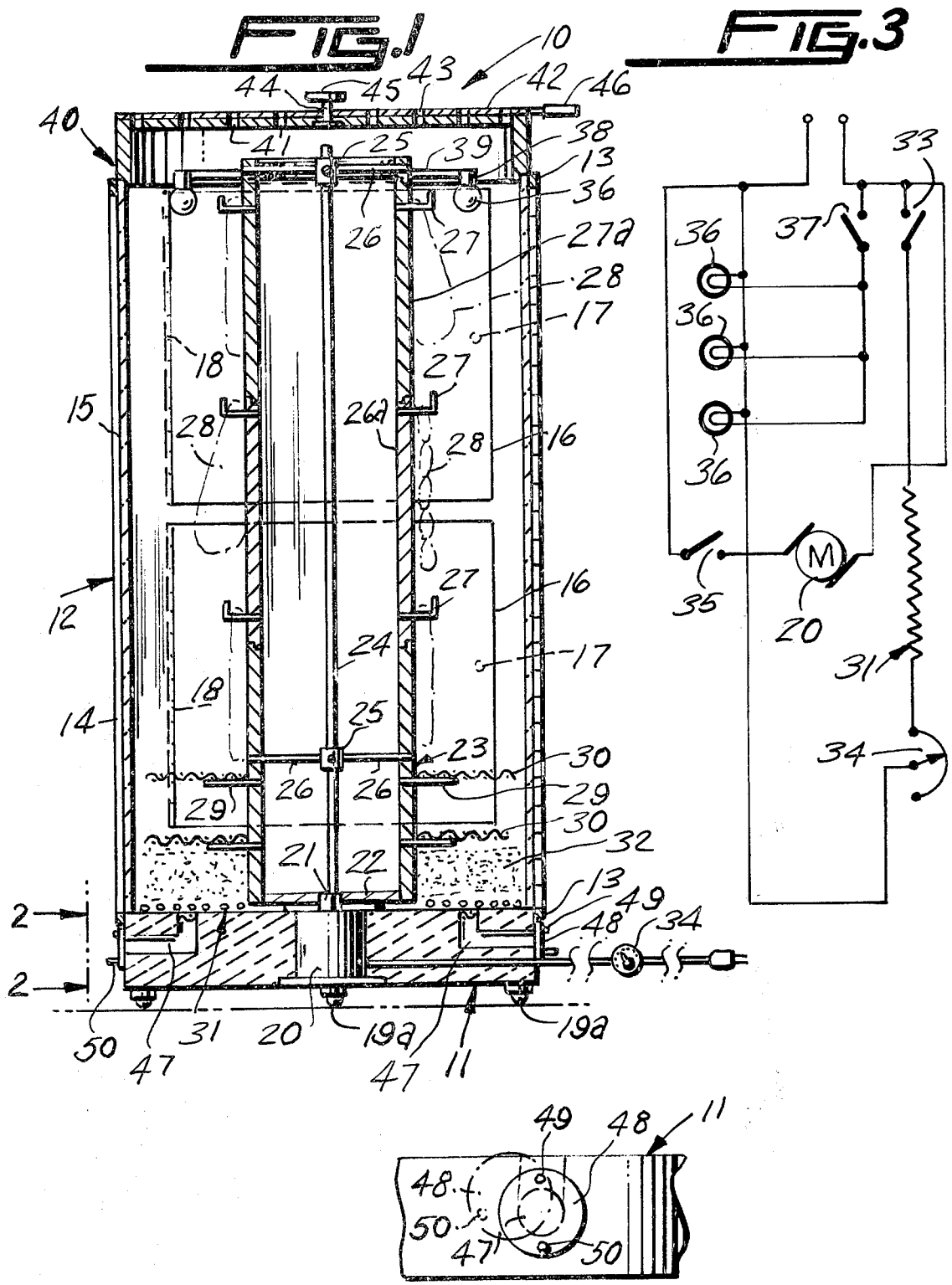

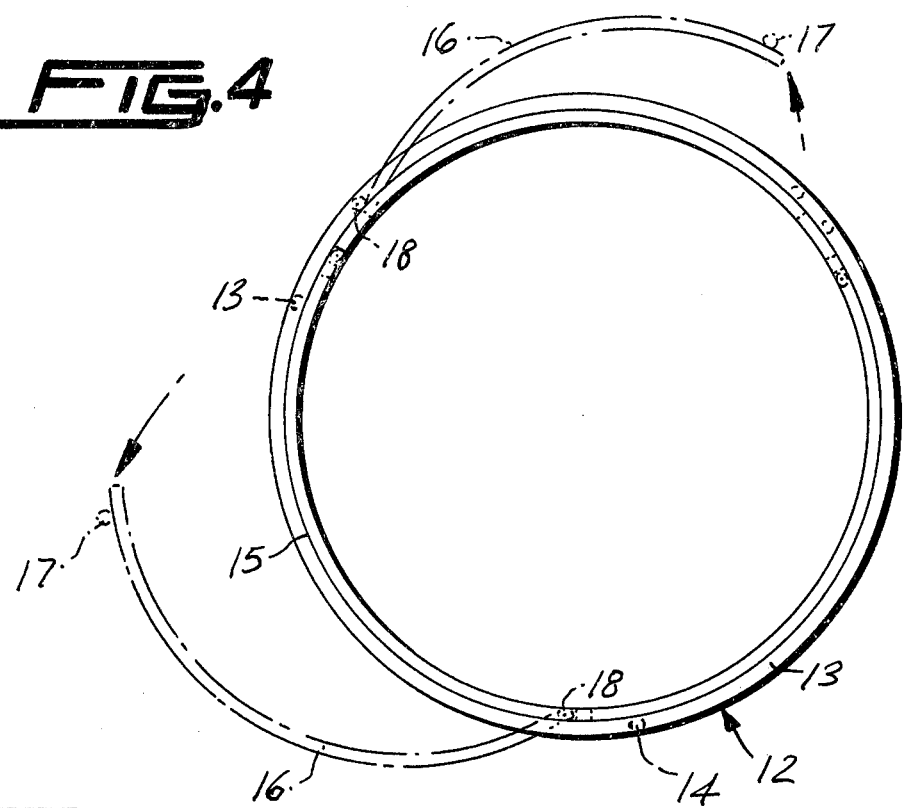
FIG.4
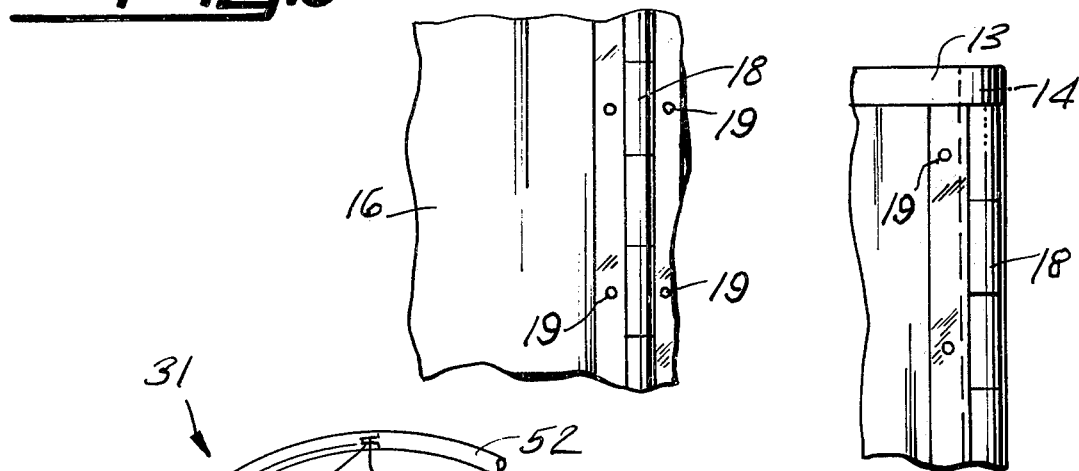
FIG.5
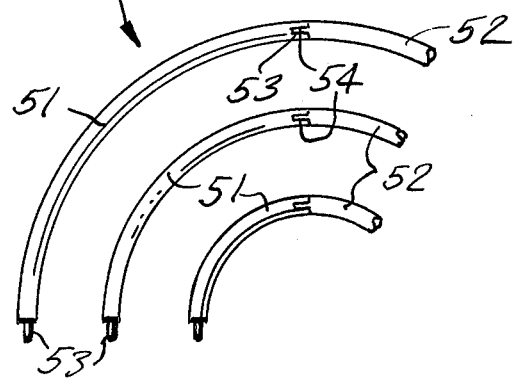
FIG.7
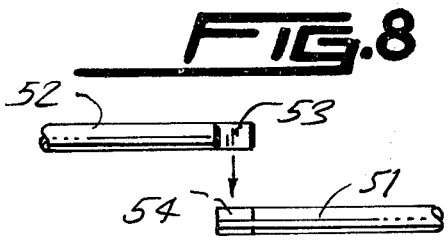
FIG.6
FIG.8

COMBINATION MEAT SMOKING DEVICE AND MERCHANDISE DISPLAY CASE

This invention relates to smoke producing device, and more particularly to a combination meat smoking device and merchandise display case.

It is therefore the principal object of this invention to provide a combination meat smoking device and merchandise display case, which will effectively smoke meats and will be adaptable for use in commercial packing plants.

Another object of this invention is to provide a device of the type described, which will include a structure consisting of an outer cylinder made of a clear and transparent plastic which is heat resistant and will enable the viewers to actually see the smoking of meats on the interior of the device.

Another object of this invention is to provide a device of the type described, which will have the outer cylinder mounted to a base portion having roller bearing means so as to enable the device to be mobile and motor means within the base so as to rotate the inner cylinder which is made of an opaque plastic of heat resistant material.

Another object of this invention is to provide a device of the type described, of which the inner cylinder will have hook means from which the meats may suspend in a spaced apart relationship along the outer peripheral surface of the inner cylinder.

A further object of this invention is to provide a device of the type described, which will have lower grill means for the supporting of meats and the interior of the device will have a heating element and illuminating means.

A still further object of this invention is to provide a device of the type described, which will employ a suitable sawdust or hickory chips for the smoking process, which will be ignited by the electric heating element within the lower extremity of the structure, the heat range being controlled by rheostat means.

An even further object of this invention is to provide a device of the type described, which will have removable cover means having manually manipulated and perforated disc means serving as control vent means for the upper portion of the device and the base will include suitable draft passageway means covered by plate valve means which will be manually manipulated or otherwise.

Other objects of the invention are to provide a combination meat smoking device and merchandise display case, which is simple in design, inexpensive to manufacture, rugged in construction, easy to use and efficient in operation.

These and other objects will be readily evident upon a study of the following specification and the accompanying drawings, wherein:

FIG. 1 is a vertical view of the present invention shown in section, with the meats being shown in phantom lines.

FIG. 2 is an enlarged view taken along the line 2—2 of FIG. 1.

FIG. 3 is a schematic wiring diagram of the invention.

FIG. 4 is an enlarged diagrammatic plan view of the outer cylinder showing the hinged sections and doors, in phantom lines, in the partially opened position.

FIG. 5 is an enlarged fragmentary view of the outer cylinder showing the mounting of one of the doors.

FIG. 6 is an enlarged fragmentary view showing the mounting of one of the outer cylinder sections to the frame of the device.

FIG. 7 is a fragmentary plan view showing a segmented heating element for the invention.

FIG. 8 is a fragmentary side view showing how the segments of FIG. 7, are placed together.

According to this invention a combination meat smoking device and merchandise display case 10, is shown to include a circular base 11 made of a suitable refractory material. Secured fixedly to base 11 in a suitable fashion, is nickel plated metal frame 12. Frame 12 consists of a pair of spaced apart metal rings 13 one of which is secured fixedly to the upper portion of base 11. A plurality of spaced apart vertical members 14 are fixedly secured between the rings 13 so as to support a transparent outer cylinder 15 which is made of a suitable heat resistant plastic. Outer casing or cylinder 15 includes hinged door 16 means which are provided with handle grips 17 for the opening and closing thereof. Doors are secured to hinges 18 by suitable fasteners 19. An electric motor 20 is removably secured within the center of base 11 by suitable manner fixedly within the center of turntable 22 and the outer peripheral edge of turntable 22 is secured fixedly in a suitable manner, through the lower internal periphery of inner casing or cylinder 23 which is made of a suitable opaque and transparent plastic material which is heat resistant. An extension shaft 24 carried by shaft 21 of motor 20, extends the length of inner cylinder 23 on its interior and mounted to extension 24, are a pair of spaced apart hubs 25. Hubs 25 are fixedly secured to extension 24 and a plurality of radially spaced apart rods 26 extend therefrom. Rods 26 of hubs 25 are secured fixedly in a suitable manner, through the inner periphery 26a of inner cylinder 23 so as to thus provide rigidity for the rotating cylinder 23. A plurality of radially spaced apart hooks 27 extend from the outer periphery 27a of inner cylinder 23 so as to provide support means for the various meats 28 which are to be smoked. On the lower extremity of cylinder 23 are projecting and radially spaced apart rods 29 which provide support means for grills 30 upon which meats may be placed so as to barbecue them. Base 11 is provided with spaced apart passageways within the heating element 31 so as to easily ignite the hickory chips 32 or other suitable sawdust. An on-off switch 33 is wired in series with heating element 31 and rheostat 34, the rheostat 34 providing heat control means for device 10. The circuit of device 10 includes an on-off switch 35 which is wired in series with motor 20 and a plurality of spaced apart bulbs 36 are wired in parallel with the circuit of device 10 and switch 37 enables the bulbs 36 to be switched on and off when desired. Bulbs 36 are removably received within sockets 38 which are fixedly secured to pipes 39 which are radially spaced apart and extend from the outer periphery 27a of inner cylinder 23, the bulbs 36 enable the device 10 to be illuminated so that a person or persons may view the smoking of the meats 28. The upper opened end of cylinder 15 removably receives a a cover 40 which is provided with a plurality of spaced apart openings 41 for smoke passage. A valve plate 42 is provided with similar openings 43 which serve as controllable aperture means for covering and uncovering openings 41 of cover 40. Valve plate 42 rotatably carried on the shaft 44 fixedly secured to cover 40 and a handle 45 upon shaft 44 enables cover 40 to be removed from cylinder 15. An extending handle 46 of valve plate 42 enables the user to manually manipulate valve plate 42 so as to control the smoke coming out of device 10. A plurality of passageways 47 within base 11 provide for draft means so that oxygen may support the combustion of chips 32. Passageways 47 are covered and uncovered by means of a circular valve plate 48 which is pivotably secured to base 11 by means of a pin 49 secured fixedly to base 11. The valve plates 48 are manually manipulated by means of knobs 50 and the plates 48 fixedly engage the outer periphery of base 11 in order that the passageways 47 may be partially covered and uncovered when desired. Heating element 31 includes a plurality of arcuate members 51 and 52 the arcuate members 51 having extending tongues 53 and grooves 54 on members 52 so as to be replaceable when needed. The tongues 53 and grooves 54 serve to interlock to form a complete circuit.

In use, the lower door 16 is opened so as to place the hickory chips 32 in the bottom of cylinder 15 so that they may be ignited by means of the heating element 31. The doors 16 are opened so to enable the user to place the meats 28 in a suspending manner from the hooks 27. The doors 16 are then closed and the switches 33, 37 and 35 are switched to the on position thus starting the smoking process and the air supporting the combustion of chips 32 is entered into the passageways 47 which are controllable by means of the valve plate 48 and the smoke control is achieved by manipulating or rotating the handle 46 which will cover and uncover the openings 41 of the cover 40.

What I claim is:

1. A combination smoking and merchandise display device adapted to treat food products by smoke producing means comprising
   a base,
   an outer transparent casing including upper and lower ends,
   the lower end of said outer casing secured to said base,
   a cover secured to the upper end of said outer casing,
   an inner casing mounted in said outer casing,
   means in said base to rotate said inner casing,
   food product support means on said inner casing,
   said smoke producing means adapted to be supported on said base intermediate said inner and outer casings,
   means in said base to control the amount of air to said smoke producing means,
   means in said cover to control the amount of smoke emitted from said device upon ignition of said smoke producing means.

2. The invention of claim 1 further including at least one heating element supported on said base intermediate said inner and outer casings and adapted to ignite said smoke producing means.

3. The invention of claim 1 further including means in said device to at least partially illuminate said food products.

4. The invention of claim 1 further including at least one shelf secured to said inner casing above and in proximity to said smoke producing means whereby food products placed thereon are barbequed.

5. The invention of claim 1 further including an elongated, vertically extending shaft driven by said means to rotate said inner casing, and connecting means intermediate said shaft and said inner casing.

6. A combination smoking and merchandise display device adapted to treat food products by smoke producing means comprising
   a base,
   an outer transparent cylinder including upper and lower ends,
   the lower end of said outer cylinder fixedly secured to said base,
   a cover secured to the upper end of said outer cylinder,
   an inner cylinder coaxially mounted in said outer cylinder,
   means in said base to rotate said inner cylinder about its longitudinal axis,
   food product support means on said inner cylinder,
   said smoke producing means adapted to be supported on said base intermediate said inner and outer cylinders,
   means in said base to control the amount of air to said smoke producing means,
   means in said cover to control the amount of smoke emitted from said device upon ignition of said smoke producing means.

7. The invention of claim 1 further including at least one door in said outer transparent casing.

8. The invention of claim 1 wherein said outer transparent casing comprises a plurality of hinged doors.

9. The invention of claim 6 further including a plurality of doors in said outer transparent cylinder.

* * * * *